(No Model.)
J. W. FAESTL.
HOOF CLEANER.
No. 490,474. Patented Jan. 24, 1893.
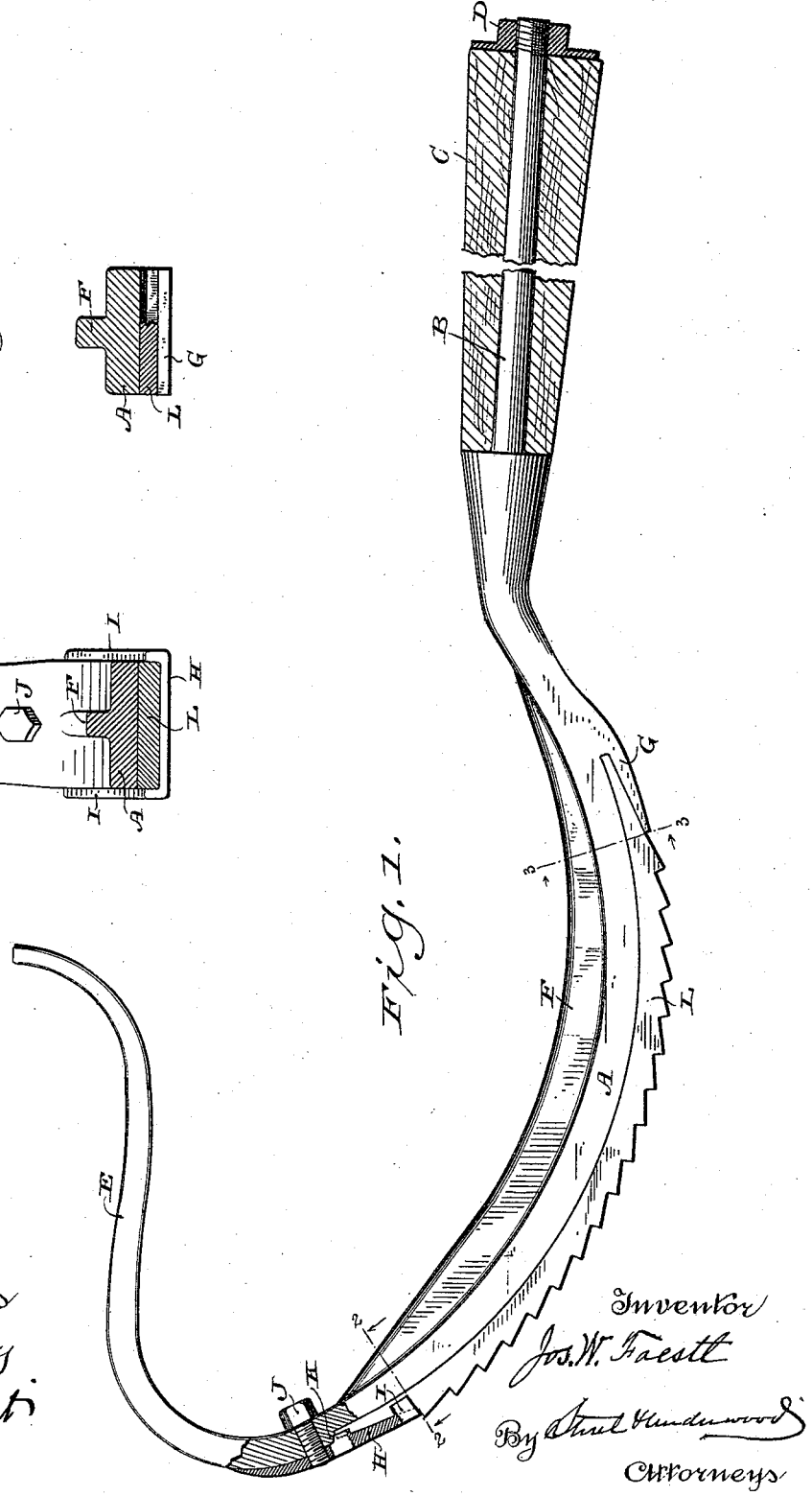

UNITED STATES PATENT OFFICE.

JOSEPH W. FAESTL, OF TROY, WISCONSIN.

HOOF-CLEANER.

SPECIFICATION forming part of Letters Patent No. 490,474, dated January 24, 1893.

Application filed May 24, 1888. Serial No. 274,929. (No model.)

*To all whom it may concern:*

Be it known that I, JOSEPH W. FAESTL, of the town of Troy, in the county of Walworth, and in the State of Wisconsin, have invented certain new and useful Improvements in Hoof-Cleaners; and I do hereby declare that the following is a full, clear, and exact description thereof.

My invention relates to hoof-cleaners; and it consists in certain peculiarities of construction and combination of parts to be hereinafter described with reference to the accompanying drawings and subsequently claimed.

In the drawings: Figure 1 represents an elevation partly in section of a hoof-cleaner constructed according to my invention, Fig. 2 a transverse section taken on line 2—2 Fig. 1, and Fig. 3 a similar view taken on line 3—3 same figure.

Referring by letter to the drawings A represents a curved back-piece that is preferably made of malleable iron and reduced at its rear end to form a shank B for a wooden handle C, the latter being held in place by the nut D screw-threaded on said shank, although other suitable means may be employed for the same purpose.

The forward end of the back-piece A is in the form of a compound-curve or in other words it is bent up, to the rear and outwardly to form a hand-grip E, and I also prefer to provide the rear side of said back-piece with a strengthening rib F, as best illustrated in Fig. 1. The front side of the back-piece toward the shank is provided with a lip G that is preferably inclined upon its inner face, this lip being also preferably in one piece with said back-piece. Detachably connected to the back-piece at about the point where the compound-curved hand-grip E begins is another lip H, the latter being also preferably inclined upon its inner face and provided with side flanges I.

The preferred means for securing the lip H in place is a set screw J that passes through the back-piece and said lip, as shown in Fig. 1. At the point where the lip H joins the back-piece, the latter is provided with a shoulder K, and against this shoulder rests the front end of a curved file L, the rear end of the latter being slipped in under the lip G as best illustrated in Fig. 1. Should the file L break, or be worn out it is only necessary to detach the lip H in order to remove said file, this operation being very easily effected.

The tool above described is specially designed for cleaning hard hoofs, and by its use I do away with the injurious practice of burning a hoof in order to soften the accumulations that get in between the frog and crust.

The operator uses the tool with both hands and said tool being curved all parts of the hoof between the frog and crust can be acted upon and thoroughly cleaned.

Having thus fully described my invention what I claim as new and desire to secure by Letters-Patent, is:—

A hoof cleaning tool consisting of a curved back-piece having one end thereof provided with a handle and prolonged at the other end to form another handle having a compound curve, the permanent lip G on the back-piece, the lip H having the side flanges I, the set-screw J engaging the latter lip and back-piece, and a file retained on said back-piece by said lips, substantially as set forth.

In testimony that I claim the foregoing I have hereunto set my hand, at Eagle, in the county of Waukesha and State of Wisconsin, in the presence of two witnesses.

JOSEPH W. FAESTL.

Witnesses:
WILLIAM CRANK,
FRANCIS G. PARKS.